United States Patent
Ito

(10) Patent No.: US 11,148,474 B2
(45) Date of Patent: Oct. 19, 2021

(54) TIRE

(71) Applicant: SUMITOMO RUBBER INDUSTRIES, LTD., Hyogo (JP)

(72) Inventor: Kae Ito, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 390 days.

(21) Appl. No.: 16/193,371

(22) Filed: Nov. 16, 2018

(65) Prior Publication Data

US 2019/0176528 A1 Jun. 13, 2019

(30) Foreign Application Priority Data

Dec. 13, 2017 (JP) .............................. JP2017-238870

(51) Int. Cl.
*B60C 11/03* (2006.01)
*B60C 11/12* (2006.01)
*B60C 11/11* (2006.01)

(52) U.S. Cl.
CPC ........... *B60C 11/0306* (2013.01); *B60C 11/11* (2013.01); *B60C 11/125* (2013.01); *B60C 11/1218* (2013.01); *B60C 11/1236* (2013.01); *B60C 11/1259* (2013.01); *B60C 11/1263* (2013.01); *B60C 2011/0346* (2013.01);
(Continued)

(58) Field of Classification Search
CPC . B60C 11/04; B60C 11/1218; B60C 11/1236; B60C 11/1259; B60C 11/1263; B60C 2200/06
See application file for complete search history.

(56) References Cited

U.S. PATENT DOCUMENTS

2001/0022209 A1* 9/2001 Chaen ..................... B60C 11/12
152/151
2012/0216931 A1* 8/2012 Shiono .................... B60C 11/12
152/209.18
(Continued)

FOREIGN PATENT DOCUMENTS

CN 107031304 A 8/2017
EP 2767413 A2 8/2014
(Continued)

OTHER PUBLICATIONS

European Search Report, European Patent Office, Application No. 18205558.2, dated Apr. 23, 2019, 7 pages.
(Continued)

*Primary Examiner* — Jacob T Minskey
*Assistant Examiner* — Virak Nguon
(74) *Attorney, Agent, or Firm* — Greenblum & Bernstein, P.L.C.

(57) ABSTRACT

A tire includes four zigzag circumferential grooves and hexagonal blocks divided by the lateral grooves each extending so as to connect between adjacent ones of the zigzag circumferential grooves. The zigzag circumferential grooves include a pair of center circumferential grooves each having a groove width not more than 4.0 mm and a pair of shoulder circumferential grooves each having a groove width larger than that of each of the center circumferential grooves. A depth of each of the lateral grooves is smaller than a depth of each of the zigzag circumferential grooves, and a groove bottom of each of the lateral grooves is provided with a first sipe.

19 Claims, 7 Drawing Sheets

(52) U.S. Cl.
CPC ............ *B60C 2011/0348* (2013.01); *B60C 2011/0353* (2013.01); *B60C 2011/0355* (2013.01); *B60C 2011/0367* (2013.01); *B60C 2011/1213* (2013.01); *B60C 2011/1231* (2013.01); *B60C 2200/06* (2013.01)

(56) References Cited

U.S. PATENT DOCUMENTS

| | | | |
|---|---|---|---|
| 2014/0345767 A1* | 11/2014 | Tanaka | B60C 11/1204 152/209.22 |
| 2015/0151583 A1* | 6/2015 | Takahashi | B60C 11/04 152/209.18 |
| 2015/0251500 A1* | 9/2015 | Pokutta-Paskaleva | B60C 11/1236 152/209.25 |
| 2015/0343848 A1* | 12/2015 | Washizuka | B60C 11/12 152/209.18 |
| 2016/0082779 A1* | 3/2016 | Maehara | B60C 11/1236 152/209.27 |
| 2017/0253088 A1 | 9/2017 | Maehara | |

FOREIGN PATENT DOCUMENTS

| | | |
|---|---|---|
| EP | 2786880 A2 | 10/2014 |
| EP | 2821256 A1 | 1/2015 |
| JP | 2017-154708 A | 9/2017 |

OTHER PUBLICATIONS

U.S. Appl. No. 16/135,735 to Hiroki Hokazono, filed Sep. 19, 2018.
U.S. Appl. No. 16/204,509 to Shoichi Wada, filed Nov. 29, 2018.

* cited by examiner

TIRE

TECHNICAL FIELD

The present invention relates to a tyre having decreased rolling resistance.

BACKGROUND ART

Japanese Patent Application Publication No. 2017-154708 has proposed a tyre for heavy load having a tread portion provided with a plurality of hexagonal blocks, for example. This tyre is provided with a pair of center circumferential grooves and a pair of shoulder circumferential grooves extending in a zigzag manner in a tyre circumferential direction. Further, a land region between the center circumferential grooves and the land region between one of the center circumferential grooves and one of the shoulder circumferential grooves adjacent thereto are each divided into the hexagonal blocks by lateral grooves each connecting between top portions of the adjacent zigzags.

In each of the hexagonal blocks configured as such, a block center portion thereof is wide and an interior angle of each of corners thereof is also large. Thereby, deformation between the start of contacting the ground and the end of contacting the ground is small, therefore, it is excellent in rolling resistance performance.

However, due to recent demands for upgrading of tyres, there has been a demand for further improvement in the rolling resistance performance.

In view of such a situation, the inventor of the present invention proposed decreasing a groove width of each of the center circumferential grooves to 4.0 mm or less. In this case, at the time of contacting the ground, it is possible that adjacent ones of the blocks contact each other with the center circumferential groove therebetween to support each other, therefore, it is possible that the rolling resistance performance is further improved.

On the other hand, however, the supporting blocks receive force from the supported blocks, therefore, the supporting blocks tend to accumulate strain in the lateral grooves. Particularly, a tyre having a block pattern is usually mounted on a driving wheel, therefore, it receives a longitudinal force in the same direction during driving and braking. Thereby, a new problem arises that cracks are likely to occur in groove bottoms of the lateral grooves, particularly at root portions of the blocks.

SUMMARY OF THE INVENTION

A primary object of the present invention is to provide a tyre capable of suppressing the occurrence of cracks in the groove bottoms of the lateral grooves while further improving the rolling resistance performance by changing the groove widths of the center circumferential grooves.

In one aspect of the present invention, a tyre comprises a tread portion comprising four zigzag circumferential grooves each extending in a zigzag manner in a tyre circumferential direction, lateral grooves each extending so as to connect between top portions of the zigzag circumferential grooves adjacent to each other, and hexagonal blocks divided by the zigzag circumferential grooves and the lateral grooves, wherein the four zigzag circumferential grooves include a pair of center circumferential grooves and a pair of shoulder circumferential grooves each having a groove width larger than that of each of the center circumferential grooves, a groove width of each of the center circumferential grooves is not more than 4.0 mm, a depth (D1) of each of the lateral grooves is smaller than a depth (D0) of each of the zigzag circumferential grooves, and a groove bottom of each of the lateral grooves is provided with a first sipe extending along a respective one of the lateral grooves.

In another aspect of the invention, it is preferred that a depth (d1) of the first sipe from the groove bottom of each of the lateral grooves is not less than 1.0 mm.

In another aspect of the invention, it is preferred that a depth (d1) of the first sipe from the groove bottom of each of the lateral grooves is not more than 75% of a difference (D0−D1) between the depth (D0) of each of the zigzag circumferential grooves and the depth (D1) of each of the lateral grooves.

In another aspect of the invention, it is preferred that the first sipe extends in a zigzag manner.

In another aspect of the invention, it is preferred that each of the hexagonal blocks is provided with a second sipe extending so as to cross a respective one of the hexagonal blocks in a tyre axial direction.

In another aspect of the invention, it is preferred that the second sipe extends in a zigzag manner.

In another aspect of the invention, it is preferred that the second sipe includes a pair of shallow bottom portions provided on both sides in the tyre axial direction and a deep bottom portion connecting therebetween.

In another aspect of the invention, it is preferred that a depth (d2a) of each of the shallow bottom portions is not more than 50% of a depth (d2b) of the deep bottom portion.

In another aspect of the invention, it is preferred that a length of the deep bottom portion is in a range of from 20% to 60% of a length of the second sipe.

In another aspect of the invention, it is preferred that the second sipe is a three-dimensional sipe.

In another aspect of the invention, it is preferred that an angle (Oα) of the zigzag of each of the center circumferential grooves with respect to the tyre circumferential direction is in a range of from 5 to 20 degrees.

DESCRIPTION OF THE PREFERRED EMBODIMENT

An embodiment of the present invention will now be described below in detail in conjunction with accompanying drawings.

Figure 1:
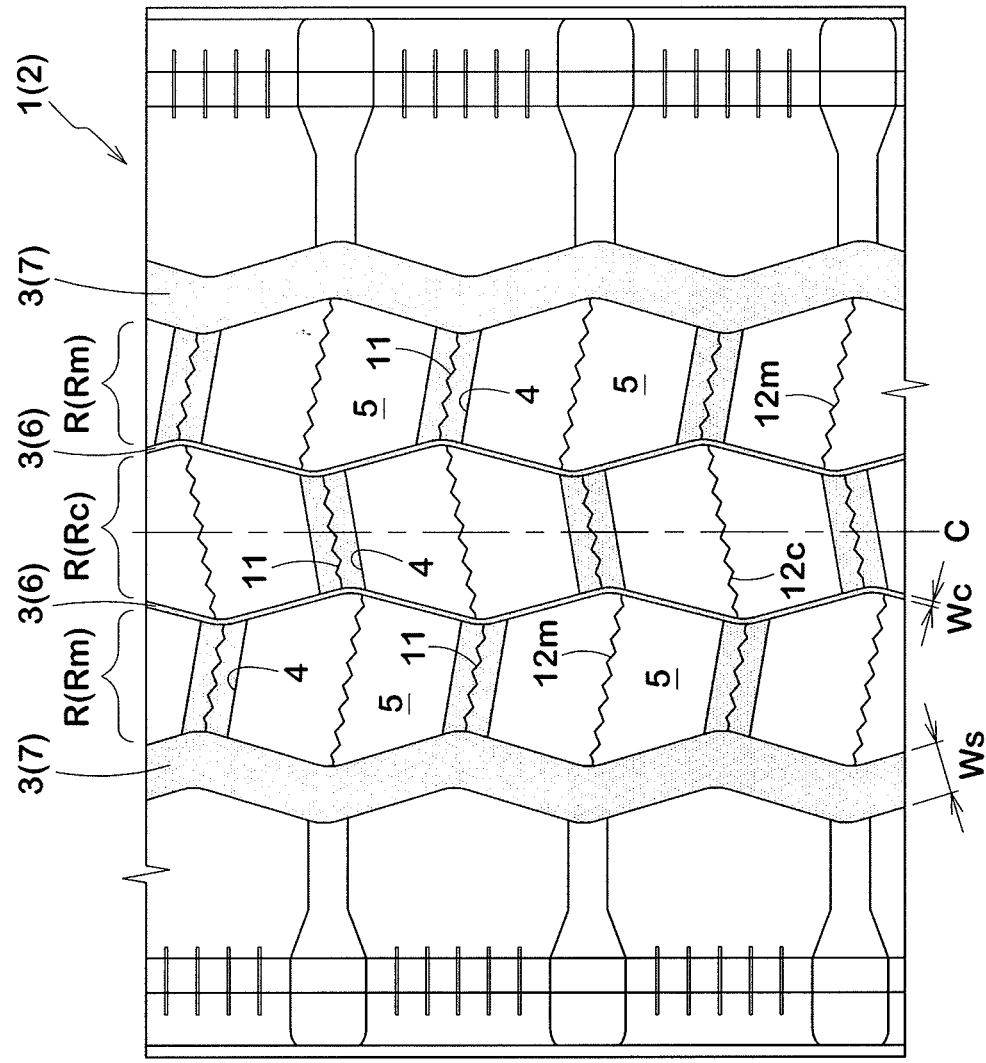
FIG. 1 is a development view of a tread portion of a tyre as an embodiment of the present invention.

FIG. 1 is a development view of a tread portion 2 of a tyre 1 showing an embodiment of the present invention. In this embodiment, explanation will be made of the tyre 1 formed as a pneumatic tyre for heavy load as an example. However, it is possible that the tyre in this embodiment is formed as various tyres such as a pneumatic tyre for a passenger car and a commercial vehicle, and a non-pneumatic tyre (an airless tyre, for example) not filled with pressurized air therein, for example.

As shown in FIG. 1, the tyre 1 includes four zigzag circumferential grooves 3 extending in a zigzag manner in the tyre circumferential direction on the tread portion 2. Further, the tread portion 2 is provided with lateral grooves 4 each extending so as to connect between a pair of the zigzag circumferential grooves 3 adjacent to each other in a tyre axial direction, thereby, each of land regions (R) defined between a pair of the zigzag circumferential grooves 3 adjacent to each other is divided into hexagonal blocks 5.

The four zigzag circumferential grooves 3 include a pair of center circumferential grooves 6 and a pair of shoulder circumferential grooves 7.

The center circumferential grooves 6 extend one by one on both sides of a tyre equator (C) in the zigzag manner in the tyre circumferential direction. Each of the shoulder circumferential grooves 7 extends in the zigzag manner in the tyre circumferential direction on an outer side in the tyre axial direction of a respective one of the center circumferential grooves 6. A groove width (wc) of each of the center circumferential grooves 6 is not more than 4.0 mm, and larger than a groove width (ws) of each of the shoulder circumferential grooves 7.

Figure 2B:
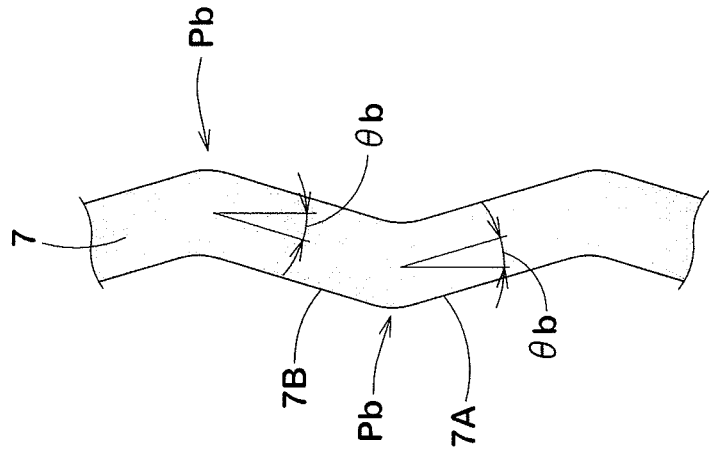
FIG. 2B is a development view of one of shoulder circumferential grooves.
Figure 2A:
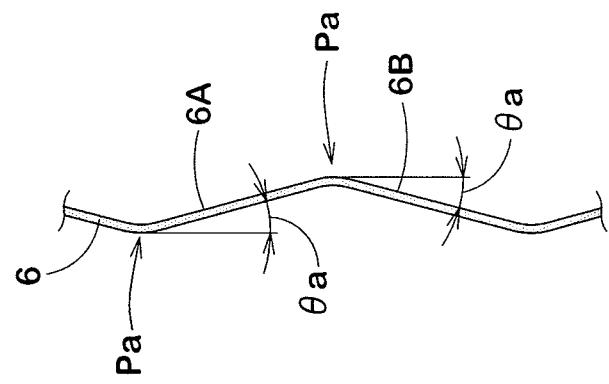
FIG. 2A is a development view of one of center circumferential grooves.

As shown in FIG. 2A, the center circumferential grooves includes first inclined portions 6A and second inclined portions 6B arranged alternately in the tyre circumferential direction. The first inclined portions 6A are inclined toward one side (the lower right side in FIG. 2A) with respect to the tyre circumferential direction and the second inclined portions 6B are inclined toward the other side (the lower left side in FIG. 2A) with respect to the tyre circumferential direction. Each of intersecting portions of the first inclined portions 6A and the second inclined portions 6B is referred to as a top portion (Pa) of the zigzag. Further, as shown in FIG. 6B, the shoulder circumferential grooves 7 is similarly configured to include first inclined portions 7A and second inclined portions 7B arranged alternately in the tyre circumferential direction and the first inclined portions 7A are inclined toward one side (the lower right side in FIG. 2B) with respect to the tyre circumferential direction and the second inclined portions 7B are inclined toward the other side (the lower left side in FIG. 2B) with respect to the tyre circumferential direction. Each of intersecting portions of the first inclined portions 7A and the second inclined portions 7B is referred to as a top portion (Pb) of the zigzag.

The center circumferential groove 6 and the shoulder circumferential groove 7 have the same number of the top portions (Pa) and (Pb) per circumference of the tyre.

Figure 3:
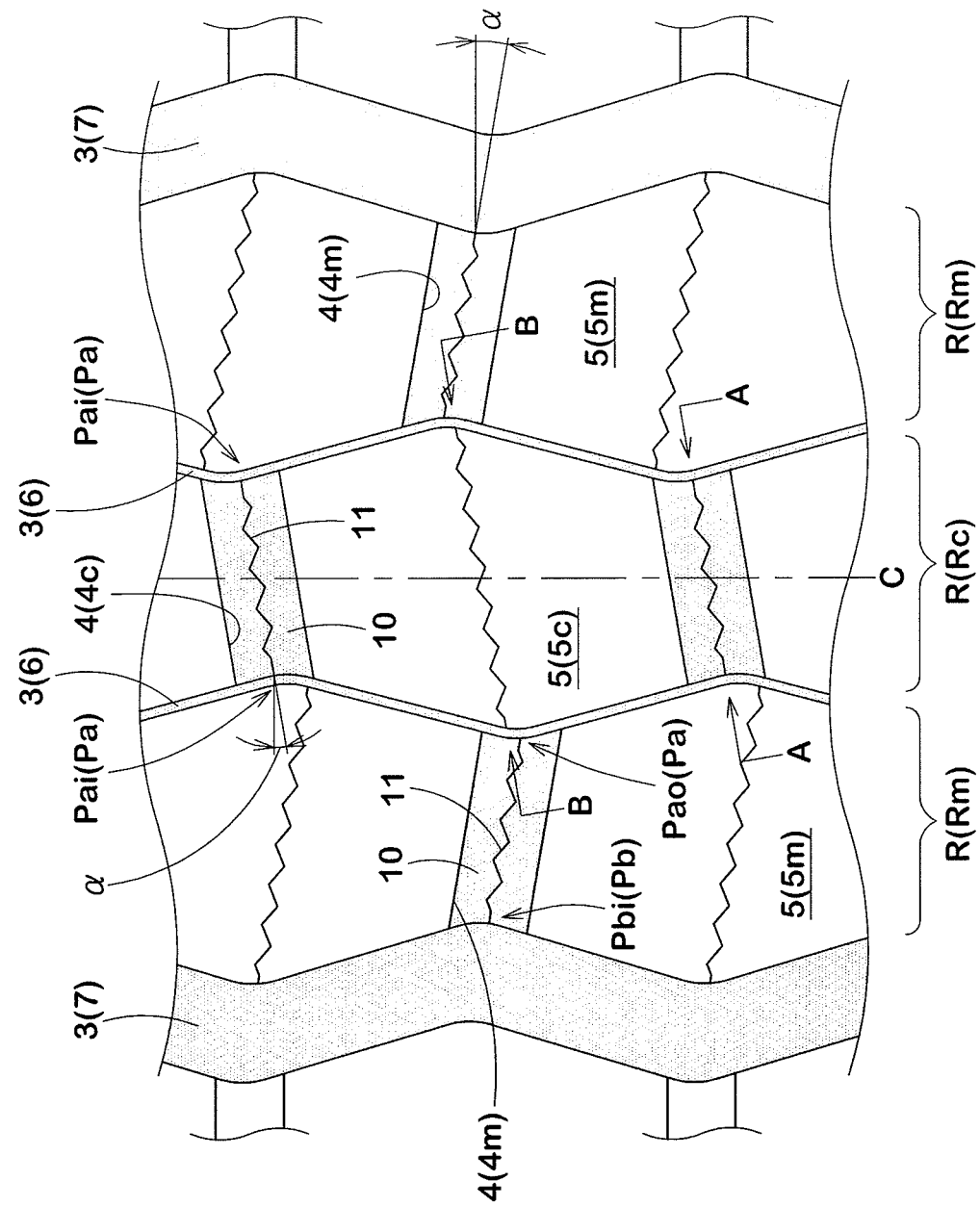
FIG. 3 is an enlarged development view of a main part of the tread portion.

As shown in FIG. 3, phases of the zigzags of one of the center circumferential grooves 6 and the other one of the center circumferential grooves 6 are shifted by about a half pitch in the tyre circumferential direction. Thereby, a land region (Rc) (may be referred to as a center land region (Rc)) defined between the center circumferential grooves 6 includes wide portions and narrow portions arranged alternately and repeatedly in the tyre circumferential direction.

The land region (Rc) is provided with lateral grooves (4c) each extending in a respective one of the narrow portions. Specifically, each of the lateral grooves (4c) is formed so as to connect between one of top portions (Pai) of one of the center circumferential grooves 6 and one of the top portions (Pai) adjacent thereto in the tyre circumferential direction of the other one of the center circumferential grooves 6. The top portions (Pai) are the top portions (Pa) which are convex inwardly in the tyre axial direction among the top portions (Pa) of the center circumferential grooves 6. Thereby, the center land region (Rc) is divided into a plurality of hexagonal blocks (5c) each surrounded by the lateral grooves (4c) and the first and the second inclined portions 64 and 6B. Note that the lateral groove (4c) connecting between the top portions (Pai) means that the top portions (Pai) are positioned between wall surfaces on both sides of the lateral groove (4c).

Similarly, phases of the zigzags of one of the center circumferential grooves 6 and one of the shoulder circumferential grooves 7 adjacent thereto are shifted by about a half pitch in the tyre circumferential direction. Thereby, each of land regions (Rm) (may be referred to as middle land regions (Rm)) each defined between one of the center circumferential grooves 6 and its adjacent one of the shoulder circumferential grooves 7 includes the wide portions and the narrow portions arranged alternately and repeatedly in the tyre circumferential direction.

The land region (Rm) is provided with lateral grooves (4m) each extending in a respective one of the narrow portions. Specifically, each of the lateral grooves (4m) is formed so as to connect between one of top portions (Pao) of one of the center circumferential grooves 6 and one of top portions (Pbi) adjacent thereto in the tyre circumferential direction of one of the shoulder circumferential grooves 7 adjacent thereto. The top portions (Pao) are the top portions (Pa) which are convex outwardly in the tyre axial direction among the top portions (Pa) of the center circumferential grooves 6. The top portions (Pbi) are the top portions (Pb) which are convex inwardly in the tyre axial direction among the top portions (Pb) of the shoulder circumferential grooves 7. Thereby, each of the middle land regions (Rm) is divided into a plurality of hexagonal blocks (5m) each surrounded by the lateral grooves (4m) and the first inclined portions 6A and 7A and the second inclined portions 6B and 7B. Note that the lateral groove (4m) connecting between the top portions (Pao) and (Pbi) means that the top portions (Pao) and (Pbi) are positioned between wall surfaces on both sides of the lateral groove (4m).

In each of the hexagonal blocks (5c) and (5m) configured as such, a block center portion thereof is wide and an interior angle of each of corners thereof is also large. Thereby, they have larger rigidity and are more excellent in rigidity balance as compared with rectangular blocks and the like. Therefore, it is possible that deformation amount of the tyre when contacting the ground is made small, thereby, it is advantageous for the rolling resistance performance.

Figure 5A:
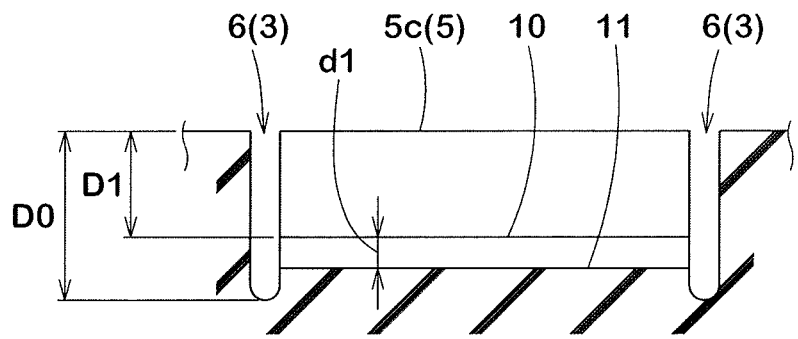
FIG. 5A is a cross-sectional view taken along A-A line of FIG. 3.

FIG. 5A is a cross-sectional view of one of the lateral grooves (4c) taken along a longitudinal direction thereof as an representative example. As shown in the Figure, a depth (D1) of each of the lateral grooves (4c) and (4m) is set to be smaller than a depth (D0) of each of the center circumferential grooves and the shoulder circumferential grooves 7. Thereby, circumferential rigidity of the hexagonal blocks (5c) and (5m) is increased, therefore, the deformation in the tyre circumferential direction is further suppressed, thereby, it becomes more advantageous for the rolling resistance performance.

It is preferred that the depth (D1) of each of the lateral grooves (4c) and (4m) is in the range of from 40% to 80% of the depth (D0), and if it's more than 80%, it becomes difficult to maintain sufficient circumferential rigidity of the hexagonal blocks 5. Conversely, if it's less than 40%, it becomes difficult to secure sufficient wet performance. Note that it is possible that the depth (D0) is variously determined according to customary practice and that the depth in the range of from 10 to 16.5 mm is preferably adopted for the tyres for heavy load.

As shown in FIG. 3, it is preferred that the lateral grooves (4c) and (4m) are inclined with respect to the tyre axial direction. In this situation, it is preferred that an angle α of each of the lateral grooves (4c) and (4m) is in the range of from 4 to 18 degrees with respect to the tyre axial direction from the point of view of balance between traction performance and the wet performance. Further, it is preferred that the lateral grooves (4c) are inclined in the opposite direction to the lateral grooves (4m).

Furthermore, in the tyre 1 in this embodiment, in order to improve the rolling resistance performance, the groove width (wc) of each of the center circumferential grooves 6 is set to be not more than 4.0 mm.

With the center circumferential grooves 6 configured as such having the narrow groove widths, it is possible that one of the hexagonal blocks (5c) and one of the hexagonal blocks (5m) adjacent to each other with one of the center circumferential grooves 6 therebetween come into contact with each other to support each other against the longitudinal force and lateral force received from the road surface when the tyre contacts the ground. Thereby, it is possible that the deformation of the hexagonal blocks (5c) and (5m) is made small, therefore, it is possible that the rolling resistance performance is further improved.

Figure 4:
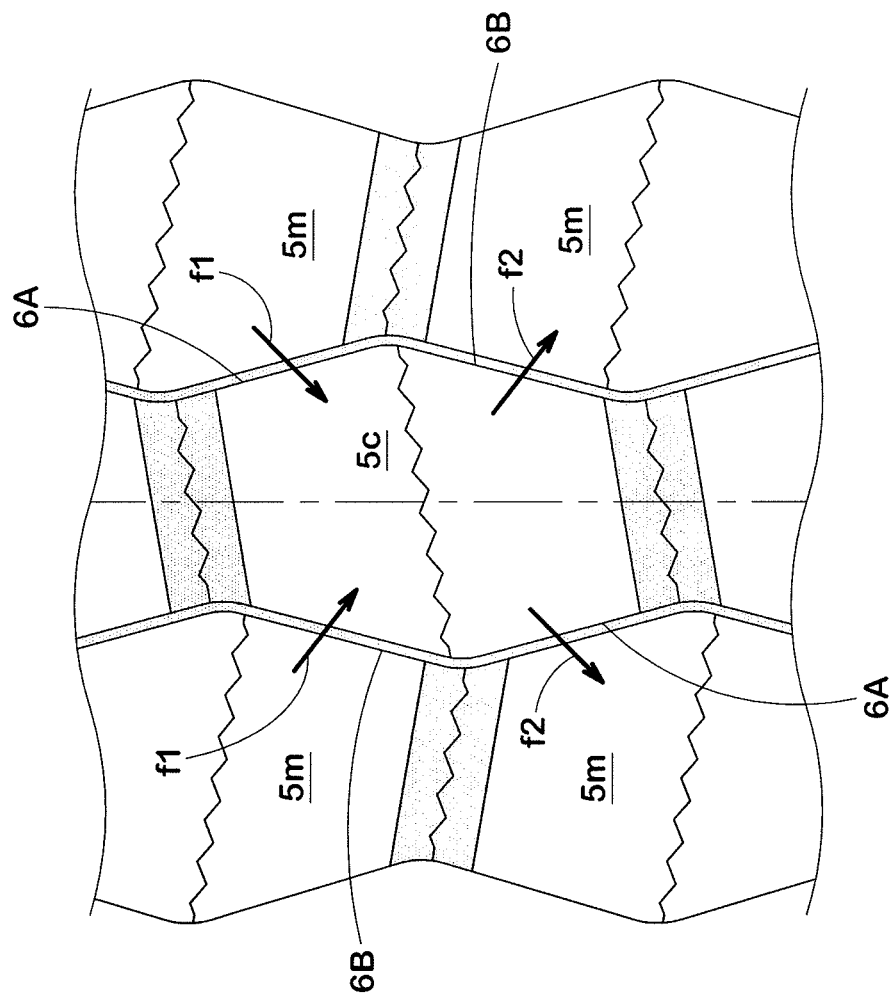
FIG. 4 is a conceptual diagram showing an action and an effect of the present invention.

Specifically, as shown in FIG. 4, when one of the hexagonal blocks (5m) receives the force from the road surface to lean in an arrow direction (f1), for example, the inclined portions 6A or 6B of the center circumferential grooves 6 close, therefore, it is possible that the hexagonal block (5m) comes into contact with the hexagonal block (5c) adjacent thereto. Similarly, when one of the hexagonal blocks (5c) receives the force from the road surface to lean in an arrow direction (f2), for example, the inclined portions 6A or 6B of the center circumferential grooves 6 close, therefore, it is possible that the hexagonal block (5c) comes into contact with the hexagonal blocks (5m) adjacent thereto. Thereby, due to the zigzag configuration of the center circumferential grooves 6 and the narrow groove width (wc) of not more than 4.0 mm, it is possible that the hexagonal blocks (5c) and (5m) contact each other to support each other, therefore, the deformation of the hexagonal blocks (5c) and (5m) is decreased, thereby, it is possible that the rolling resistance performance is further improved. The hexagonal blocks (5c) and (5m) configured as such are effective for supporting each other when they lean in the tyre circumferential direction.

If the groove width (wc) of each of the center circumferential grooves 6 is more than 4.0 mm, it is difficult for the hexagonal blocks (5c) and (5m) to support each other. Thereby, it is preferred that the upper limit of the groove width (wc) is preferably not more than 3.0 mm, more preferably not more than 2.5 mm. Note that the lower limit of the groove width (wc) is preferably not less than 1.0 mm, more preferably not less than 1.5 mm from the point of view of the wet performance.

If an angle (θa) (shown in FIG. 2A) of the zigzag of each of the center circumferential grooves 6 with respect to the tyre circumferential direction is too small, it is difficult for the hexagonal blocks (5c) and (5m) to support each other. Thereby, it is preferred that the lower limit of the angle (θa) is not less than 5 degrees. Note that it is preferred that the upper limit of the angle (θa) is not more than 20 degrees from the point of view of the wet performance. The angle (θa) is defined as an angle of each of the first and the second inclined portions 6A and 6B with respect to the tyre circumferential direction. The angle (θa) of each of the first inclined portions 6A may be different from the angle (θa) of each of the second inclined portions 6B. Further, the angle (θa) may vary within the above range according to a variable pitch method or the like.

Although it is not particularly limited, it is preferred that an angle (θb) (shown in FIG. 2B) of the zigzag of each of the shoulder circumferential grooves 7 with respect to the tyre circumferential direction is in the same range as the angle (θa) from the point of view of maintaining the rigidity balance of the hexagonal blocks (5c) and (5m) high. Note that the angle (θb) is defined as an angle of each of the first and the second inclined portions 7A and 7B with respect to the tyre circumferential direction. The angle (θb) of each of the first inclined portions 7A may be different from the angle (θb) of each of the second inclined portions 7B. Further, similar to the angle (θa), the angle (θb) may vary within the above range according to the variable pitch method or the like.

Furthermore, in this structure, the supporting hexagonal blocks 5 receive force from the supported hexagonal blocks 5, therefore, strain tends to accumulate in groove bottoms 10 of the lateral groove 4. Thereby, as shown in FIG. 3, the tyre 1 of the present invention is provided with first sipes 11 each extending along a respective one of the lateral grooves 4 in the groove bottom 10 thereof.

Each of the first sipes 11 in this embodiment extends in a widthwise groove center of a respective one the lateral grooves (4c) and (4m). Further, each of the first sipes 11 is formed to extend over the entire length of a respective one of the lateral grooves (4c) and (4m). It is possible that the first sipes 11 configured as such moderate the strain in a direction in which the lateral grooves (4c) and (4m) open, therefore, it is possible that the occurrence of cracks in the groove bottoms 10 is suppressed.

As shown in FIG. 5A, it is preferred that a depth (d1) of each of the first sipes 11 from the groove bottom 10 of a respective one of the lateral grooves 4 (the lateral grooves 4(c) and (4m)) is not less than 1.0 mm. If it is less than 1.0 mm, the effect of moderating the strain of the groove bottoms 10 cannot be expected. Further, it is preferred that the depth (d1) is not more than 75% of a difference (D0−D1) between the depth (D0) of each of the zigzag circumferential grooves 3 and the depth (D1) of each of the lateral grooves 4. If the depth (d1) is more than 75% of the difference (D0−D1), each of the first sipes 11 is too deep, therefore, movement between the hexagonal blocks (5c) and between the hexagonal blocks (5m) becomes large. Thereby, it is likely that the rolling resistance performance is deteriorated and that uneven wear such as heel and toe wear occurs in the hexagonal blocks (5c) and (5m). From such a point of view, it is more preferred that the lower limit of the depth (d1) is not less than 3 mm and that the upper limit is not more than 65% of the difference (D0−D1).

It is preferred that each of the first sipes 11 is a zigzag sipe extending in a zigzag manner in a length direction thereof. By opening, the first sipes 11 moderate the strain of the lateral grooves 4. At this time, strain accumulates in sipe bottoms as well, therefore, it is possible that cracks occur in the sipe bottoms. If the first sipes 11 are straight sipes, the strain is connected linearly at each of the sipe bottoms, therefore, it is likely that the cracks grow. On the other hand, if they are formed in a zigzag shape, the strain is not connected linearly, therefore, it is possible that the cracks are suppressed from occurring in the sipe bottoms.

Figure 6A:
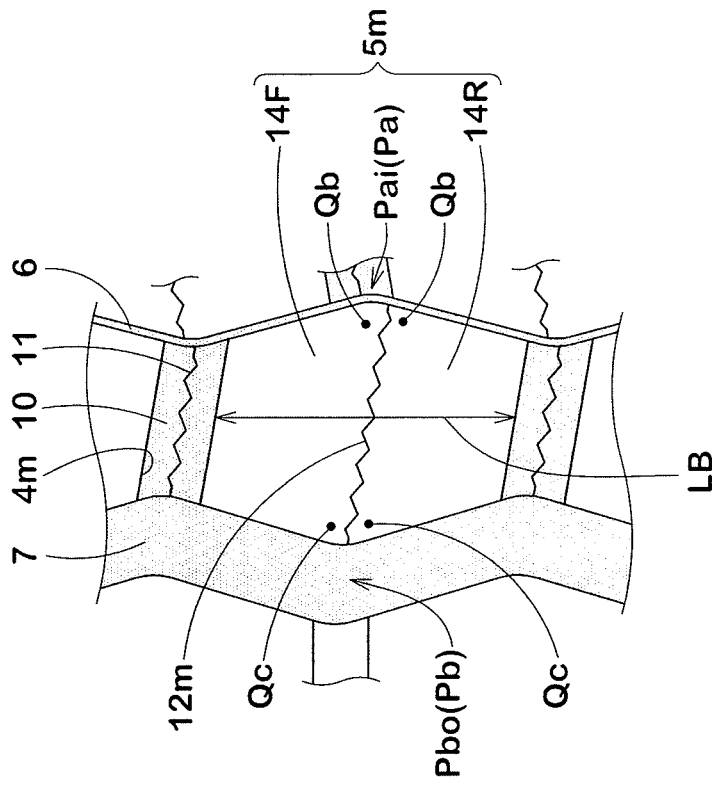
FIG. 6A is an enlarged plan view of one of hexagonal blocks.
Figure 6B:
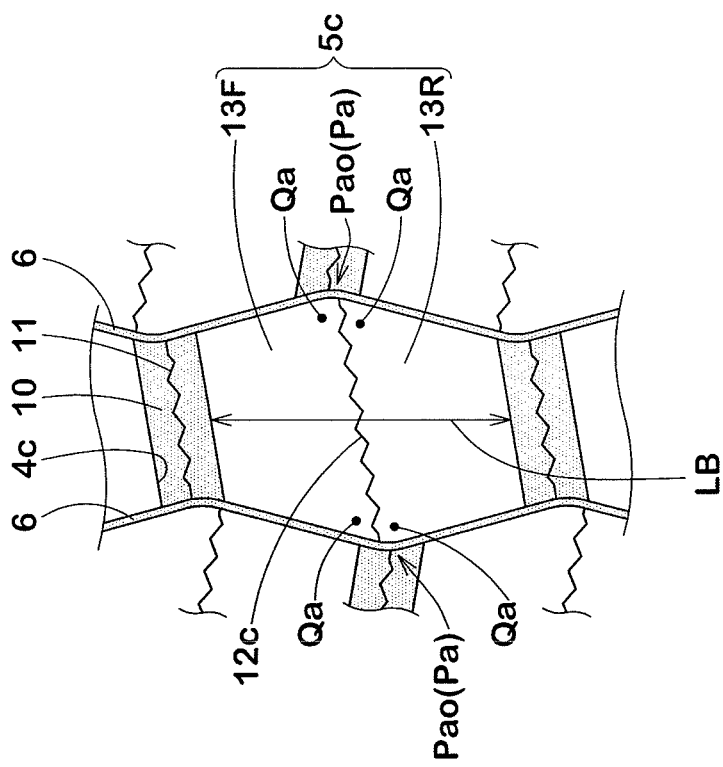
FIG. 6B is an enlarged plan view of one of the hexagonal blocks.

As shown in FIGS. 6A and 6B, each of the hexagonal blocks (5c) is provided with a second sipe (12c) extending so as to cross the hexagonal blocks (5c) in the tyre axial direction and each of the hexagonal blocks (5m) is provided with a second sipe (12m) extending so as to cross the hexagonal blocks (5m) in the tyre axial direction.

Each of the second sipes (12c) in this embodiment extends in the wide portion of a respective one of the hexagonal blocks (5c). Specifically, both ends of each of the second sipes (12c) respectively intersect with the center circumferential grooves 6 in the vicinity of a respective one of the top portions (Pao) which are the top portions convex outwardly in the tyre axial direction among the top portions (Pa) of the center circumferential grooves 6. The "vicinity" described above means that a circumferential distance from the top portion (Pao) is within a distance range not more than 10% of a circumferential length LB of each of the hexagonal blocks (5c).

Each of the second sipes (12c) divides a respective one of the hexagonal blocks (5c) into a block portion 13F arranged on a heel side and a block portion 13R arranged on a toe side. In each of the blocks configured as such, the block portion 13F on the heel side leaves the ground earlier during rolling. Thereby, the strain caused by the movement of the entire block becomes smaller as compared with the undivided block, therefore, the rolling resistance is decreased. Further, the block portion 13F on the heel side leaves the ground earlier, therefore, the time during the lateral groove (4c) is open becomes short. Thereby, the strain caused by the movement of the entire block is further decreased. Therefore, the strain in the groove bottoms 10 of the lateral grooves (4c) is decreased, thereby, the cracks are suppressed from occurring in the groove bottoms 10.

It is preferred that the second sipes (12c) are inclined in the same direction as the lateral grooves (4c), and it is specifically preferred that they extend in parallel with the lateral grooves (4c).

Similarly, each of the second sipes (12m) extends in the wide portion of a respective one of the hexagonal blocks (5m). Specifically, one end of each of the second sipes (12m) intersects with one of the center circumferential grooves 6 in the vicinity of a respective one of the top portions (Pai) which are the top portions convex inwardly in the tyre axial direction among the top portions (Pa) of the center circumferential grooves 6. The other end of each of the second sipes (12m) intersects with one of the shoulder circumferential grooves 7 in the vicinity of a respective one of top portions (Pbo) which are the top portions convex outwardly in the tyre axial direction among the top portions (Pb) of the shoulder circumferential grooves 7. The "vicinity" described above means that the circumferential distance from the top portion (Pai) and the circumferential distance from the top portion (Pbo) are within a distance range not more than 10% of the circumferential length LB of each of the hexagonal blocks (5m).

It is preferred that the second sipes (12m) are inclined in the same direction as the lateral grooves (4m) as well and it is specifically preferred that they extend in parallel with the lateral grooves (4m) as well.

Each of the second sipes (12m) divides a respective one of the hexagonal blocks (5m) into a block portion 14F arranged on the heel side and a block portion 14R arranged on the toe side. Thereby, the strain caused by the movement of the entire hexagonal block (5m) becomes small, therefore, the rolling resistance is decreased and the strain in the groove bottoms 10 of the lateral grooves (4m) is decreased, thereby, the cracks are suppressed from occurring in the groove bottoms 10.

Figure 5B:
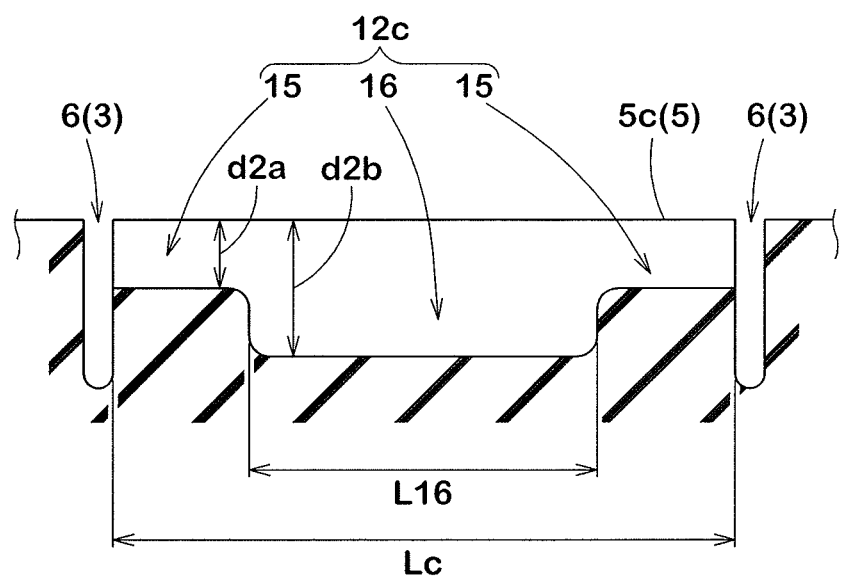
FIG. 5B is a cross-sectional view taken along B-B line of FIG. 3.

FIG. 5B is a conceptual cross-sectional view of one of the second sipes (12c) taken along a longitudinal direction thereof as an representative example. As shown in the figure, each of the second sipes (12c) and (12m) includes a pair of shallow bottom portions 15 and a deep bottom portion 16 connecting therebetween.

It is possible that the second sipes (12c) and (12m) configured as such suppress the cracks from occurring in the sipe bottoms as compared with sipes having a constant depth. Further, by having the shallow bottom portions 15 on both sides in the tyre axial direction, it is possible that the rigidity of the hexagonal blocks (5c) and (5m) is secured, therefore, it is possible that the effect of supporting adjacent blocks is maintained. Thereby, it is possible that excellent rolling resistance performance is exerted and that the uneven wear such as the heel and toe wear is suppressed.

Further, as shown in FIGS. 6A and 6B, it is possible that the rigidity of acute-angled portions (Qa) each sandwiched between one of the second sipes (12c) and one of the center circumferential grooves 6 is secured, therefore, it is possible that the uneven wear starting from the acute-angled portions (Qa) is suppressed. Similarly, it is possible that the rigidity of acute-angled portions (Qb) each sandwiched between one of the second sipes (12m) and one of the center circumferential grooves 6 and the rigidity of acute-angled portions (Qc) each sandwiched between one of the second sipes (12m) and one of the shoulder circumferential grooves 7 are secured, therefore, it is possible that the uneven wear starting from the acute-angled portions (Qb) and (Qc) is suppressed.

It is preferred that a depth (d2a) of each of the shallow bottom portions 15 is not more than 50% of a depth (d2b) of the deep bottom portion 16. If it's more than 50%, the effect of providing the shallow bottom portions 15 and the deep bottom portion 16 is not sufficiently exerted.

In each of the second sipes (12c), it is preferred that a length (L16) of the deep bottom portion 16 is in the range of from 20% to 60% of a length (Lc) of each of the second sipes (12c). Although not shown in the figures, in each of the second sipes (12m), it is preferred that the length (L16) of the deep bottom portion 16 is in the range of from 20% to 60% of a length (Lm) of each of the second sipes (12m). If the length (L16) is more than the above range, it becomes difficult to ensure the rigidity of the hexagonal blocks (5c) and (5m). Further, if the length (L16) is less than the above range, the effect of suppressing the cracks from occurring in the sipe bottoms of the second sipes (12c) and (12m) is decreased.

From the point of view of suppressing the occurrence of the cracks in the sipe bottoms, it is preferred that the second sipes (12c) and (12m) are zigzag sipes each extending in a zigzag manner, and it is particularly preferred that they are three-dimensional sipes 21.

Figure 7:
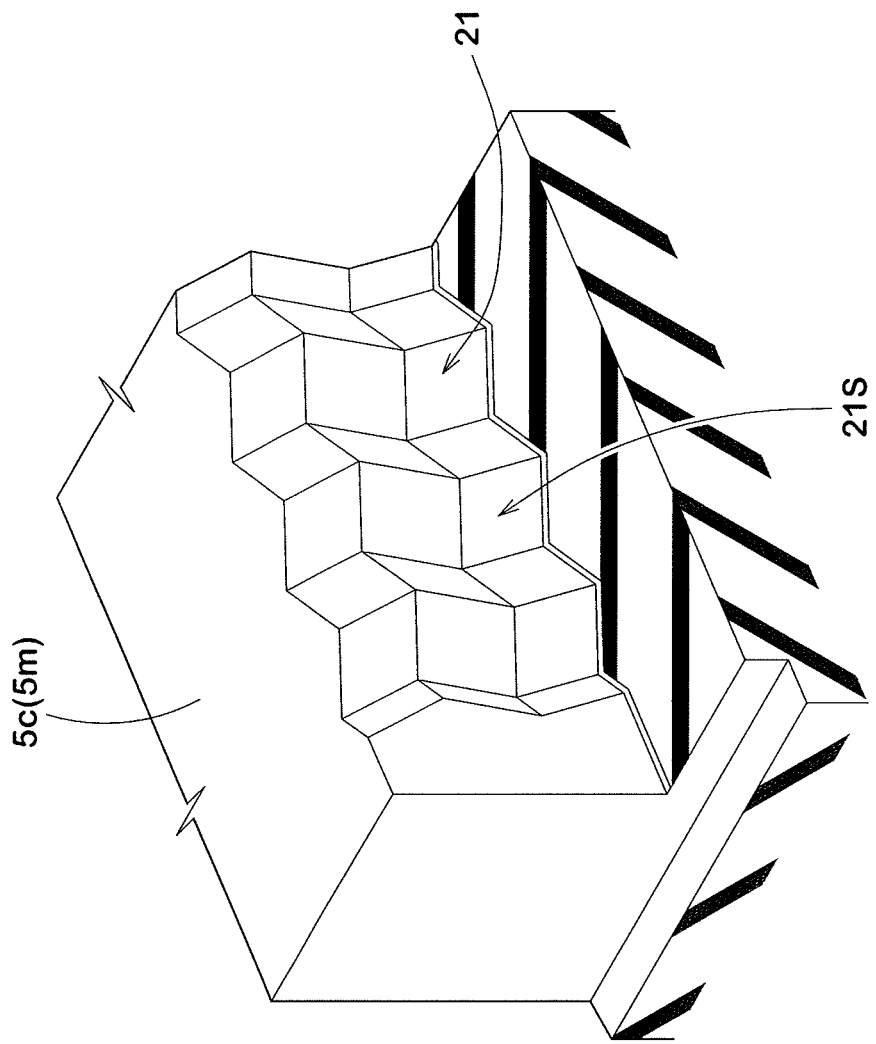
FIG. 7 is perspective view conceptually showing a three-dimensional sipe.

As conceptually shown in FIG. 7, the three-dimensional sipe 21 means a sipe extending in a zigzag manner in a sipe length direction thereof on a surface of the block and having sipe wall surfaces (21s) each extending in a zigzag manner in a sipe depth direction thereof as well. In the three-dimensional sipes 21 configured as such, irregularity formed on the sipe wall surfaces (21s) on both sides of the sipe are firmly engaged with each other. Thereby, it is possible that block rigidity is secured high and that the effect of suppressing the occurrence of the cracks in the sipe bottoms is increased.

While detailed description has been made of the tyre as an especially preferred embodiment of the present invention, the present invention can be embodied in various forms without being limited to the illustrated embodiment.

WORKING EXAMPLES (EXAMPLES)

Tyres for heavy load of size 11R22.5 having the basic pattern shown in FIG. 1 were made by way of test according to the specifications listed in Table 1, then each of the test tyres was tested for uneven wear resistance performance, the rolling resistance performance, and resistance to cracks in the bottoms of the lateral grooves and the sipe bottoms. The tyres as Example 3 were used as control tyres. The test methods were as follows.

<Resistance to Cracks>

Under the following conditions, the control tyres were mounted on one side of the drive shaft of a ten-ton-load truck (2-D car) and the test tyres were mounted on the other side of the drive shaft, and then the test car was driven on a general road.

Tyre rim size: 22.5×8.25
Tyre inner pressure: 720 kPa

At the end of the test drive (at the time of 70% wear of the control tyres), the occurrence situation of the cracks (depths and lengths of the cracks) in the groove bottoms of the lateral grooves (parts excluding the sipes if the lateral grooves had the sipes) and the sipe bottoms of the first and the second sipes were observed.

With respect to the lateral grooves, if the depth of each of the cracks was not less than 1 mm, or the length of each of the cracks was not less than 5 mm in either the lateral grooves of the center land region or the lateral grooves of the middle land region, the tyres were labeled as "disqualified (D)". Further, among the tyres labeled as qualified, those in which a product of the depth and the length of each of the cracks was not more than 4 were labeled as "excellent (E)" and those in which the product was more than 4 were labeled as "good (G)".

With respect to the first and the second sipes, the tyres in which the depth of each of the cracks was not less than 1 mm or the length of each of the cracks was not less than 5 mm in any one of the sipes were labeled as "disqualified (D)". Further, among the tyres labeled as qualified, those in which the product of the depth and the length of each of the cracks was not more than 4 were labeled as "excellent (E)" and those in which the product was more than 4 were labeled as "good (G)".

<Uneven Wear Resistance Performance>

The test car described above was driven until 20% wear of the center land region was obtained in one of the test tyres and the control tyres. Then at the time of 20% wear, the following (a) and (b) were conducted.

(a): The heel and toe wear amount was measured. A smaller numerical value is better.

(b): In the blocks of the center land region, presence or absence of the uneven wear starting from the acute-angled portions was observed by visual inspection.

<Rolling Resistance Performance>

By using a rolling resistance tester, the rolling resistance of the test tyres was measured according to ISO 28580 under the following conditions. A smaller numerical value is better.

Tyre rim size: 22.5×8.25
Tyre inner pressure: 830 kPa
Tyre load: 25.01 kN
Speed: 80 km/h

TABLE 1

|  | Ref. 1 | Ref. 2 | Ex. 1 | Ex. 2 | Ex. 3 | Ex. 4 | Ex. 5 | Ex. 6 | Ex. 7 | Ex. 8 |
|---|---|---|---|---|---|---|---|---|---|---|
| Groove width (WC) of Center circumferential groove [mm] | 8 | | | | 2 | | | | | |
| First sipe | | | | | | | | | | |
| Presence (P) or Absence (A) | A | A | | | | | P | | | |
| Configuration | — | — | | | zigzag | | straight | | zigzag | |
| Sipe depth (d1) [mm] | — | — | 0.5 | 7.4 | | | 5.0 | | | |
| d1/(D0 − D1) *1 | — | — | 0.06 | 0.90 | | | 0.60 | | | |
| Second sipe | | | | | | | | | | |
| Presence (P) or Absence (A) | A | | P | | A | | straight | P | | |
| Configuration | — | | zigzag | | — | | straight | zigzag | | |
| Configuration of Sipe bottom | — | | FIG. 5B | | — | | FIG. 5B | constant depth *3 | FIG. 5B | |
| Ratio d2a/d2b of depths of Shallow bottom portions *2 | — | | 0.4 | | — | | 0.4 | | 0.8 | |
| Resistance to Cracks | | | | | | | | | | |
| Groove bottom of Lateral groove | G | D | G | E | E | G | E | E | E | E |
| Sipe bottom of First sipe | — | — | E | G | E | G | E | G | E | E |
| Sipe bottom of Second sipe | — | D | E | E | E | — | G | E | G | G |
| Uneven wear resistance performance | | | | | | | | | | |
| Wear amount of Heel and toe wear [mm] | 4.0 | 2.0 | 2.0 | 3.0 | 2.0 | 3.0 | 2.0 | 2.0 | 3.0 | 3.0 |
| Uneven wear starting from Acute-angled portion | P | A | A | A | A | — | A | A | P | P |
| Rolling resistance | 7.2 | 6.4 | 6.4 | 6.6 | 6.4 | 6.6 | 6.4 | 6.4 | 6.6 | 6.6 |

*1 D0 is depth of zigzag circumferential groove, D1 is depth of lateral groove.
*2 d2a is depth of shallow bottom portion, d2b is depth of deep bottom portion.
*3 only Shallow bottom portion TABLE 1-continued

| | Ex. 9 | Ex. 10 | Ex. 11 | Ex. 12 | Ex. 13 |
|---|---|---|---|---|---|
| Groove width (WC) of center circumferential groove [mm] | 3 | 4 | 2 | | |
| First sipe | | | | | |
| Presence (P) or Absence (A) | P | | | | |
| Configuration | zigzag | | | | |
| Sipe depth (d1) [mm] | 5.0 | | 1.0 | 6.19 | 5.0 |
| d1/(D0 − D1) *1 | 0.06 | | 0.12 | 0.75 | 0.60 |
| Second sipe | | | | | |
| Presence (P) or Absence (A) | P | | | | |
| Configuration | zigzag | | | | |
| Configuration of Sipe bottom | FIG. 5B | | | | |
| Ratio d2a/d2b of depths of Shallow bottom portions *2 | 0.4 | | | | 0.5 |
| Resistance to Cracks | | | | | |
| Groove bottom of Lateral groove | G | G | G | E | E |
| Sipe bottom of First sipe | E | E | E | E | E |
| Sipe bottom of second sipe | E | E | E | E | E |
| Uneven wear resistance performance | | | | | |
| Wear amount of Heel and toe wear [mm] | 2.0 | 2.0 | 2.0 | 2.0 | 2.0 |
| Uneven wear starting from Acute-angled portion | A | A | A | A | A |
| Rolling resistance | 6.6 | 6.8 | 6.4 | 6.4 | 6.4 |

*1 D0 is depth of zigzag circumferential groove, D1 is depth of lateral groove.
*2 d2a is depth of shallow bottom portion, d2b is depth of deep bottom portion.

As shown in the table, it can be confirmed that the tyres as the Examples were excellent in the rolling resistance performance.

The invention claimed is:

1. A tyre comprising:
   a tread portion, the tread portion comprising:
      four zigzag circumferential grooves each extending in a zigzag manner in a tyre circumferential direction;
      lateral grooves each extending so as to connect between top portions of the zigzag circumferential grooves adjacent to each other; and
      hexagonal blocks divided by the zigzag circumferential grooves and the lateral grooves, wherein
      the four zigzag circumferential grooves include a pair of center circumferential grooves adjacent to each other in a tyre axial direction with a tyre equator therebetween and a pair of shoulder circumferential grooves arranged one by one on both axial sides of and adjacently to the pair of the center circumferential grooves and each having a groove width larger than that of each of the center circumferential grooves,
      a groove width of each of the center circumferential grooves is not more than 4.0 mm,
      a depth (D1) of each of the lateral grooves is smaller than a depth (D0) of each of the zigzag circumferential grooves, and
      a groove bottom of each of the lateral grooves is provided with a first sipe extending along a respective one of the lateral grooves.

2. The tyre according to claim 1, wherein a depth (d1) of the first sipe from the groove bottom of each of the lateral grooves is not less than 1.0 mm.

3. The tyre according to claim 2, wherein the depth (d1) of the first sipe is smaller than the depth (D1) of each of the lateral grooves.

4. The tyre according to claim 1, wherein a depth (d1) of the first sipe from the groove bottom of each of the lateral grooves is not more than 75% of a difference (D0−D1) between the depth (D0) of each of the zigzag circumferential grooves and the depth (D1) of each of the lateral grooves.

5. The tyre according to claim 1, wherein the first sipe extends in a zigzag manner.

6. The tyre according to claim 1, wherein each of the hexagonal blocks is provided with a second sipe extending so as to cross a respective one of the hexagonal blocks in a tyre axial direction.

7. The tyre according to claim 6, wherein the second sipe extends in a zigzag manner.

8. The tyre according to claim 6, wherein the second sipe includes a pair of shallow bottom portions provided on both sides in the tyre axial direction and a deep bottom portion connecting therebetween.

9. The tyre according to claim 8, wherein a depth (d2a) of each of the shallow bottom portions is not more than 50% of a depth (d2b) of the deep bottom portion.

10. The tyre according to claim 8, wherein a length of the deep bottom portion is in a range of from 20% to 60% of a length of the second sipe.

11. The tyre according to claim 6, wherein the second sipe is a three-dimensional sipe.

12. The tyre according to claim 6, wherein each of the hexagonal blocks includes two top portions convex toward the outside of the block in the tyre axial direction, one by one on each side in the tyre axial direction of the block,
one end of the second sipe intersects with one of the zigzag circumferential grooves arranged adjacently to the block on one side in the tyre axial direction in the vicinity of one of the top portions on the one side, and
the other end of the second sipe intersects with one of the zigzag circumferential grooves arranged adjacently to the block on the other side in the tyre axial direction in the vicinity of the other one of the top portions.

13. The tyre according to claim 1, wherein an angle ($\theta a$) of the zigzag of each of the center circumferential grooves with respect to the tyre circumferential direction is in a range of from 5 to 20 degrees.

14. The tyre according to claim 1, wherein
an angle (α) of each of the lateral grooves with respect to the tyre axial direction is in a range of from 4 to 18 degrees.

15. The tyre according to claim 1, wherein
a groove width (Wc) of each of the center circumferential grooves is in a range of from 1.0 to 3.0 mm.

16. The tyre according to claim 1, wherein
an angle (θb) of the zigzag of each of the shoulder circumferential grooves with respect to the tyre circumferential direction is in a range of from 5 to 20 degrees.

17. The tyre according to claim 1, wherein the tread portion has only four zigzag circumferential grooves.

18. The tyre according to claim 1, wherein
the first sipe is formed to extend over an entire length of a respective one of the lateral grooves, and
both groove edges of each of the lateral grooves extend linearly over an entire length thereof.

19. A tyre comprising:
a tread portion, the tread portion comprising:
four zigzag circumferential grooves each extending in a zigzag manner in a tyre circumferential direction;
lateral grooves each extending so as to connect between top portions of the zigzag circumferential grooves adjacent to each other; and
hexagonal blocks divided by the zigzag circumferential grooves and the lateral grooves, wherein
the four zigzag circumferential grooves include a pair of center circumferential grooves and a pair of shoulder circumferential grooves each having a groove width larger than that of each of the center circumferential grooves,
a groove width of each of the center circumferential grooves is not more than 4.0 mm,
a depth (D1) of each of the lateral grooves is smaller than a depth (D0) of each of the zigzag circumferential grooves, and
a groove bottom of each of the lateral grooves is provided with a first sipe extending along a respective one of the lateral grooves,
wherein the first sipe is formed to extend over an entire length of a respective one of the lateral grooves, and both groove edges of each of the lateral grooves extend linearly over an entire length thereof.

* * * * *